Oct. 15, 1963  J. G. RYLANDER  3,107,029
BEVERAGE CAN HOLDER AND COVER
Filed Oct. 19, 1959
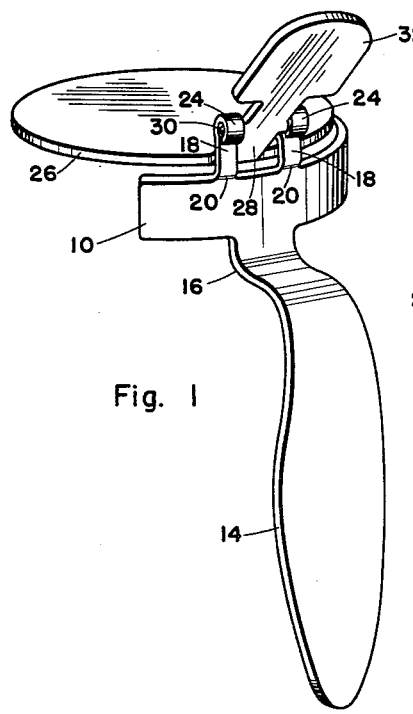
Fig. 1
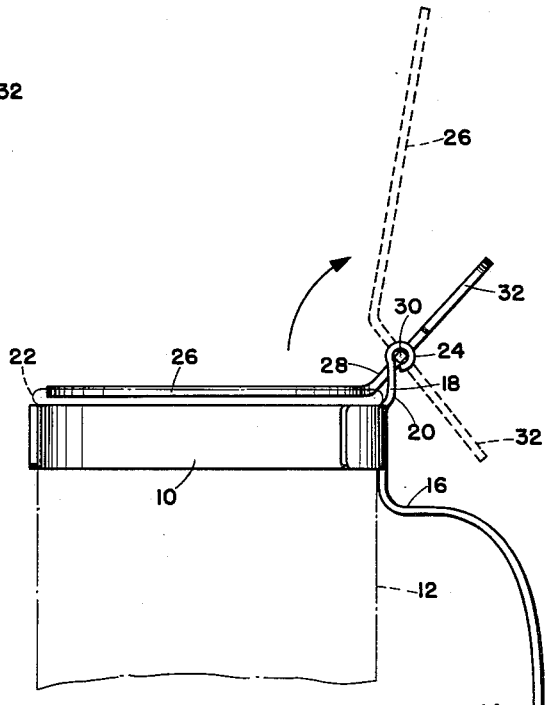
Fig. 2
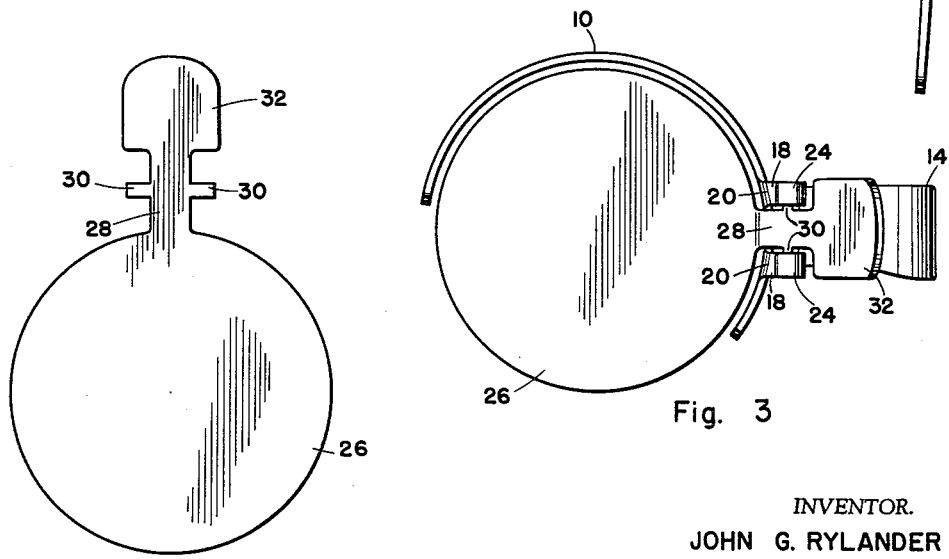
Fig. 4
Fig. 3
INVENTOR.
JOHN G. RYLANDER
BY
Knox & Knox 3,107,029
BEVERAGE CAN HOLDER AND COVER
John G. Rylander, 9115 Saddle Rock Road,
Lakeside, Calif.
Filed Oct. 19, 1959, Ser. No. 847,283
1 Claim. (Cl. 220—85)

The present invention relates generally to can holders and more particularly to a beverage can holder and cover.

The primary object of this invention is to provide a beverage can holder which clips onto a can by means of a generally semi-circular, resilient clip and has a handle which is offset adjacent one end of the clip, so that the portion of the can contacted by the lips is between the ends of the clip, whereby contact with the clip is avoided.

Another object of this invention is to provide a beverage can holder having a hinged cover which fits inside the rim of the can to enable satisfactory closure of the punctured or open end, the cover having an integral thumb actuated lifting plate for easy operation.

Another object of this invention is to provide a beverage can holder comprising only two parts, easily made from flat sheet material.

Finally, it is an object to provide a beverage can holder of the aforementioned character which is simple, safe and convenient to use and which will give generally efficient and durable service.

With these and other objects definitely in view, this invention consists in the novel construction, combination and arrangement of elements and portions, as will be hereinafter fully described in the specification, particularly pointed out in the claim, and illustrated in the drawing which forms a material part of this disclosure, and in which:

FIGURE 1 is a perspective view of the can holder;
FIGURE 2 is a side elevation view thereof, a portion of a can being indicated in broken line;
FIGURE 3 is a top plan view thereof; and
FIGURE 4 is a plan view of the blank for the cover and thumb plate portion.

Similar characters of reference indicate similar or identical elements and portions throughout the specification and throughout the views of the drawing.

The can holder comprises a resilient band or clip 10 dimensioned to fit tightly around a standard beverage can, indicated at 12 in FIGURE 2, and being of sufficient length to encompass slightly more than half the circumference of said can in order to retain the can therein. Adjacent one end of the clip 10 is a handle 14, connected to the clip by a downwardly and outwardly turned neck portion 16, said handle being suitably shaped for a comfortable grip. The handle 14 can be at either end of the clip 10 for right or left handed use. Directly above the neck portion 16 and integral with the clip 10 are two spaced, upwardly extending support lugs 18 having joggled lower portions 20 which offset said lugs outwardly to clear the rim 22 of the can 12, as in FIGURE 2. The upper ends of the support lugs 18 are rolled outwardly and closed to provide opposed, axially aligned trunnion portions 24.

Attached to the clip structure is a circular lid or cover 26, dimensioned to fit inside the rim 22 and cover the end of the can 12, said cover having an obliquely upwardly extending arm 28. Integral with the arm 28 are two opposed, outwardly projecting hinge bars 30 which are pivotally held in the trunnion portions 24, the arm being extended beyond said hinge bars and having an enlarged thumb plate 32 at the upper end thereof. The cover and arm assembly can be made from a flat sheet of material, as indicated in FIGURE 4, the rectangular hinge bars 30 thus formed being entirely satisfactory for the pivotal connection and eliminating the necessity for attaching a separate hinge pin.

The can holder is attached to the can 12 by snapping the clip 10 around the can below the rim 22, said rim resting on the upper edge of said clip. The handle 14 is spaced outwardly from the can by the neck portion 16 to provide clearance for the fingers and the cover 26 rests flat on the upper end of the can 12 inside the rim 22, completely covering the usual punctured openings in the can. Thus insects, dust and other unwanted matter are excluded. For drinking, the cover 26 is raised by depressing the thumb plate 32, which is in a convenient position above the handle, said cover being indicated in the raised position in broken line in FIGURE 2. With the handle 14 at one end of the clip 10, the clip is on the side of the can away from the mouth in normal drinking position, there being no contact of the mouth with the clip. This is preferable for sanitary reasons, since the can holder may be used by several persons.

The extremely simple two piece construction of the can holder facilitates manufacture and greatly reduces cost. While the drawing indicates the use of metal construction, certain plastics may also be suitable, the material being a matter of choice. Any conventional surface finish may be used and the shapes of the thumb plate 32, cover 26 and handle 14 may be changed for decorative purposes or to facilitate the addition of advertising matter thereon.

The operation of this invention will be clearly comprehended from a consideration of the foregoing description of the mechanical details thereof, taken in connection with the drawing and the above recited objects. It will be obvious that all said objects are amply achieved by this invention.

An additional advantage of the instant invention is that the handle, being spaced from the container, greatly lessens heat transfer from the hand to the container and its contents. This is particularly important and desirable where cold drinks are concerned.

It is understood that minor variation from the form of the invention disclosed herein may be made without departure from the spirit and scope of the invention, and that the specification and drawing are to be considered as merely illustrative rather than limiting.

I claim:

The combination comprising: a beverage can having a rimmed end; beverage can holder, comprising a resilient, can retaining clip generally semi-circular in shape and having sufficient length to encircle only slightly more than half the circumference of said can; said clip fitting under the rim of said rimmed end and being the sole supporting means for the can; a handle secured to said clip and extending downwardly and outwardly therefrom and terminating in a free end spaced well away from said can; a cover pivotally mounted on said clip to swing upwardly and outwardly therefrom; said cover being positioned to rest on the end of said can within the rim; said handle being adjacent one end of said clip, a portion of said rim of the can being clear of said clip and exposed for contact with a user's lips.

References Cited in the file of this patent

UNITED STATES PATENTS

| | | |
|---|---|---|
| 52,373 | Ireland | Jan. 30, 1866 |
| 1,104,706 | Ramsey | July 21, 1914 |
| 1,149,840 | Lange | Aug. 10, 1915 |
| 1,173,057 | Suit | Feb. 22, 1916 |
| 1,174,091 | Richards | Mar. 7, 1916 |
| 1,502,242 | French | July 22, 1924 |
| 1,763,125 | Baron | June 10, 1930 |
| 2,463,651 | Stevens | Mar. 8, 1949 |
| 2,896,812 | Paprocki | July 28, 1959 |